(12) United States Patent
McClary

(10) Patent No.: US 7,762,876 B2
(45) Date of Patent: Jul. 27, 2010

(54) CABIN EXHAUST APPARATUS AND METHOD FOR PROVIDING VEHICLE VENTILATION USING SAME

(76) Inventor: Bradley Kyle McClary, 2413 Abbey Rd., Bossier City, LA (US) 71111

( * ) Notice: Subject to any disclaimer, the term of this patent is extended or adjusted under 35 U.S.C. 154(b) by 0 days.

(21) Appl. No.: 12/466,766

(22) Filed: May 15, 2009

(65) Prior Publication Data

US 2009/0227196 A1   Sep. 10, 2009

Related U.S. Application Data

(63) Continuation of application No. 11/409,891, filed on Apr. 24, 2006, now abandoned.

(51) Int. Cl.
B60J 1/20 (2006.01)
B60H 1/26 (2006.01)
B60H 1/24 (2006.01)

(52) U.S. Cl. .................. 454/133; 454/128; 454/131; 296/152

(58) Field of Classification Search .................. 454/69, 454/128, 131, 132, 133, 134, 135, 141, 162, 454/164, 115, 116, 136; 296/152, 154
See application file for complete search history.

(56) References Cited

U.S. PATENT DOCUMENTS

| | | | |
|---|---|---|---|
| 1,336,470 A | 4/1920 | McDonald | |
| 1,574,880 A | 3/1926 | Garland | |
| 1,588,654 A | 6/1926 | Brownlee | |
| 1,606,410 A * | 11/1926 | Frame | 454/136 |
| 1,628,053 A * | 5/1927 | McTighe | 454/132 |
| 1,745,186 A * | 1/1930 | Parsons | 454/133 |
| 1,787,637 A * | 1/1931 | McNab | 454/133 |
| 1,825,192 A * | 9/1931 | Mace | 454/133 |
| 1,933,478 A * | 10/1933 | Karns | 296/152 |
| 2,073,159 A | 3/1937 | Lintern et al. | |
| 2,251,511 A | 8/1941 | Burke | |
| 3,434,408 A * | 3/1969 | Rivers et al. | 454/132 |
| 3,625,134 A | 12/1971 | Smith | |
| 3,659,516 A | 5/1972 | MacDonald | |
| 4,527,466 A * | 7/1985 | Kossor et al. | 454/133 |
| 4,546,693 A | 10/1985 | McTaw, Jr. | |
| 5,251,953 A | 10/1993 | Willey | |
| 5,683,293 A | 11/1997 | Mohammed | |
| 5,797,645 A | 8/1998 | Schenk et al. | |
| 6,042,473 A | 3/2000 | McClary | |
| 6,350,195 B1 | 2/2002 | Iino | |

\* cited by examiner

*Primary Examiner*—Steven B McAllister
*Assistant Examiner*—Patrick F. O'Reilly, III
(74) *Attorney, Agent, or Firm*—Sanford E. Warren, Jr.; Akin Gump Strauss Hauer & Feld

(57) ABSTRACT

The cabin exhaust device ventilates vehicles provided with retractable windows and mounts on a portion of the vehicle, preferably on a door frame or in an opening between a window panel and a window frame. The cabin exhaust device comprises a squeegee and a ventilation panel having an air dam, a first portion, and a second portion, wherein the first and second portions are provided with angularly oriented apertures, thereby creating a vacuum on the vehicle's interior side. The first and second portions are outwardly convexed, thereby facilitating the creation of a pressure differential between the vehicle's interior and its exterior, thus forcing the air and other contaminants out from the vehicle's interior.

20 Claims, 6 Drawing Sheets

CABIN EXHAUST APPARATUS AND METHOD FOR PROVIDING VEHICLE VENTILATION USING SAME

CROSS-REFERENCE TO RELATED APPLICATIONS

This application is a continuation of U.S. Ser. No. 11/409,891, filed on Apr. 24, 2006, entitled CABIN EXHAUST APPARATUS AND METHOD FOR PROVIDING VEHICLE VENTILATION USING SAME, by inventor Bradley Kyle McClary, currently pending.

REFERENCE TO A SEQUENCE LISTING

Not applicable.

BACKGROUND OF THE INVENTION

The present invention relates generally to ventilation devices and methods and more particularly to a ventilation device suitable for mounting with a vehicle window for ventilation and exhaust of interior air and/or associated airborne impurities or contaminants.

There are two common methods that people use to ventilate a vehicle's interior. One method is to open the vehicle's windows when the vehicle is moving or parked. This method allows smoke, pet smells, and other foul odors to be ventilated to the outside atmosphere, while simultaneously allowing the fresh, outside air to enter the vehicle's cabin. There are, however, some disadvantages to opening the vehicle's windows for ventilation. First, the outside air may not be fresh and clean at all times. For example, the outside air may include rain, snow, pollen, bugs or any number of other outside contaminants, which will also enter the vehicle's cabin. Second, while the vehicle is in a parked position and left unattended, having the windows down may result in the vehicle's theft or vandalism. Third, if the windows are down while the vehicle is in motion, the vehicle's aerodynamic qualities will be affected significantly. Approximately 10% of the vehicle's fuel economy will be lost due to drag forces. Finally, if the windows are down while the vehicle is in motion, a significant noise is produced which will cause discomfort to the ordinary passenger. The passengers will be required to converse at a higher decibel and also be required to turn vehicle audio equipment to a louder setting.

Another method commonly used to ventilate the vehicle is to use the ventilation feature on the vehicle's control panel. This feature allows fresh air at a particular temperature to enter the vehicle's cabin. While the fan functions adequately in most situations, there are some scenarios where the fan still leaves behind undesirable odors. For example, some odors which have penetrated the seat's fabric are not capable of being removed by the fans. Instead, the high velocity air entering the vehicle's window, while the vehicle is moving at high speeds, is more suitable for removing these types of odors.

Various solutions have been proposed to resolve the problem of safe vehicle ventilation. One such solution proposes using a panel mountable between a window frame and a window. Although prior art devices allow air to exchange between the vehicle's exterior and its interior, only one of these prior art devices forcefully removes air from the vehicle's interior by creating a pressure differential between the vehicle's interior and its exterior. Forceful air removal increases the speed with which the vehicle's interior is ventilated and the obnoxious odors are removed. Several drawbacks exist in the current art which include, but are not limited to, requiring the mounting of a device between the window and the window frame, the window not being capable of fully closing, inefficient pressure differential along the device, and water leakage possibilities around the device.

What has been lacking, however, until the present invention, and what the industry long has sought, is a cabin exhaust device that has flexibility in its mounting, allows the windows to fully close when exhaust is not needed, creates a more efficient pressure differential throughout the device's length and prevents water leakage around the device.

It is, therefore, an object of the present invention to disclose and claim a cabin exhaust device for use in vehicles with retractable windows.

It is another object of the present invention to provide a cabin exhaust device that facilitates the creation of a vacuum, or pressure differential, between the vehicle's interior and its exterior and along the entire length of the cabin exhaust device.

It is another object of the present invention to provide a cabin exhaust device that allows the windows to fully close while the cabin exhaust device is mounted.

It is another object of the present invention to provide a cabin exhaust device that vents cabin heat and removes odors when the vehicle is either parked or in motion.

It is yet another object of the present invention to provide a cabin exhaust device which keeps out dust, pollen, allergens, and other similar pollutants.

It is a further object of the instant invention to provide a cabin exhaust device which is easy to position and mount.

It is yet another object of the present invention to provide a cabin exhaust device which can be mounted on the outside of the door frame or in an opening between the window panel and the window frame.

It is still a further object of the present invention to provide a cabin exhaust device which is inexpensive to manufacture.

It is yet another object of the present invention to provide a cabin exhaust device which helps lower the temperature inside the cabin when the vehicle is stationary, thereby preventing the deterioration of adhesives within the vehicle, extend the life of plastics and other materials within the vehicle, and provide environmental safety to the vehicle's passengers by eliminating plastic and glue fumes as well as other contaminants that accumulate in the vehicle's cabin.

It is yet another object of the present invention to provide a cabin exhaust device which provides cabin ventilation in a fuel efficient manner.

It is yet another object of the present invention to provide a cabin exhaust device that prevents rain from entering the vehicle's cabin.

It will become apparent to one skilled in the art that the claimed subject matter as a whole, including the structure of the apparatus, and the cooperation of the elements of the apparatus, combine to result in the unexpected advantages and utilities of the present invention. The advantages and objects of the present invention and features of such a cabin exhaust device will become apparent to those skilled in the art when read in conjunction with the accompanying description, drawing figures, and appended claims.

BRIEF SUMMARY OF THE INVENTION

The present invention, when properly installed, creates a vacuum effect within the vehicle's interior resulting in odors, dust, and other airborne particulates being drawn from the vehicle's interior to its exterior. The present invention can be used for a variety of applications including, but not limited to, applications where air is desired to be vented from the interior of an apparatus to its exterior upon the apparatus' movement, thereby creating a vacuum within the apparatus' interior.

The cabin exhaust device can be mounted either on the exterior of the door frame or in an opening between the window panel and the window frame. The window is able to fully close, thus, allowing the user to easily control the on/off of the pressure differential. Also, an air dam is strategically located so that a pressure differential is created along the entire length of the cabin exhaust device. Finally, a drip shield, either integrated or non-integrated, is placed at the cabin exhaust device's lower edge to prevent rain from dripping into the vehicle's cabin. There are many more advantages provided by the present invention. Although at least one embodiment has the cabin exhaust device mounted either on the exterior of the door frame or in an opening between the window panel and the window frame, those skilled in the art will appreciate that the cabin exhaust device may also be mounted anywhere in the body of the vehicle without departing from the scope and spirit of the present invention.

A cabin exhaust device for a vehicle, the cabin exhaust device comprising: i) a ventilating panel having an inner surface, an outer surface, a top side mountable to a portion of the vehicle, a first portion located on the outer surface, a second portion located on the outer surface and a bottom side, wherein the first portion and the second portion is provided with a plurality of apertures for increasing a pressure differential between an interior of the vehicle and an exterior of the vehicle resulting in forcefully drawing air from the interior of the vehicle; and ii) an air dam connecting the first portion to the second portion.

A cabin exhaust device for a vehicle, the cabin exhaust device comprising: i) a ventilating panel having an inner surface, an outer surface, a top side mountable to a portion of the vehicle, a first portion located on the outer surface, a second portion located on the outer surface and a bottom side, wherein the first portion and the second portion is provided with a plurality of apertures for increasing a pressure differential between an interior of the vehicle and an exterior of the vehicle resulting in forcefully drawing air from the interior of the vehicle; ii) an air dam connecting the first portion to the second portion; iii) a squeegee attached to the inner surface of the ventilating panel a distance from the bottom side of the ventilating panel, the squeegee extending inwardly from the ventilating panel in relation to the interior of the vehicle, the squeegee capable of forming a continuous seal with a retractable window panel; and iv) a third portion connected to the ventilating panel extending therefrom in a planar obtuse angle, the third portion extending along a front portion of a window frame.

A method to ventilate an interior of a vehicle by creating a vacuum to forcefully push air from the interior to an exterior of the vehicle comprising the steps of: i) providing a cabin exhaust device having a ventilating panel comprising a first portion and a second portion and an air dam interposed with the first portion and the second portion, wherein a plurality of apertures are disposed on the first portion and the second portion; ii) mounting the cabin exhaust device to a portion of the vehicle; and iii) driving the vehicle in a forward motion to increase the pressure differential between the interior of the vehicle and an exterior of the vehicle resulting in forcefully drawing air from the interior of the vehicle through the plurality of apertures disposed on the cabin exhaust device.

A method to ventilate an interior of a vehicle by creating a vacuum to forcefully push air from the interior to an exterior of the vehicle comprising the steps of: i) providing a cabin exhaust device having a squeegee, a ventilating panel comprising a first portion and a second portion, and an air dam interposed with the first portion and the second portion, wherein a plurality of apertures are disposed on the first portion and the second portion; ii) mounting the cabin exhaust device to a portion of the vehicle; iii) opening a window panel within a window frame to a location above the squeegee; and iv) driving the vehicle in a forward motion to increase the pressure differential between the interior of the vehicle and an exterior of the vehicle resulting in forcefully drawing air from the interior of the vehicle through the plurality of apertures disposed on the cabin exhaust device.

The foregoing has outlined broadly the more important features of the invention to better understand the detailed description that follows, and to better understand the contribution of the present invention to the art. As those skilled in the art will appreciate, the conception on which this disclosure is based readily may be used as a basis for designing other structures, methods, and devices for carrying out the purposes of the present invention. The claims, therefore, include such equivalent constructions to the extent the equivalent constructions do not depart for the spirit and scope of the present invention. Further, the abstract associated with this disclosure is neither intended to define the invention, which is measured by the claims, nor intended to be limiting as to the scope of the invention in any way.

These together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be made to the accompanying drawings and descriptive matter in which there are illustrated embodiments of the invention.

It should be understood that any one of the features of the invention may be used separately or in combination with other features. It should be understood that features which have not been mentioned herein may be used in combination with one or more of the features mentioned herein. Other devices, methods, features, and advantages of the present invention will be or become apparent to one with skill in the art upon examination of the drawings and detailed description. It is intended that all such additional devices, methods, features, and advantages be protected by the accompanying claims.

These and other objects, features and advantages of the present invention will be more readily apparent when considered in connection with the following, detailed description of the embodiments of the invention, which description is presented in conjunction with annexed drawings below.

BRIEF DESCRIPTION OF THE SEVERAL VIEWS OF THE DRAWINGS

The foregoing summary as well as the following detailed description of the embodiments of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

The invention may take physical form in certain parts and arrangement of parts. For a more complete understanding of the present invention, and the advantages thereof, reference is now made to the following descriptions taken in conjunction with the accompanying drawings, in which.

DETAILED DESCRIPTION OF THE INVENTION

Figure 1:
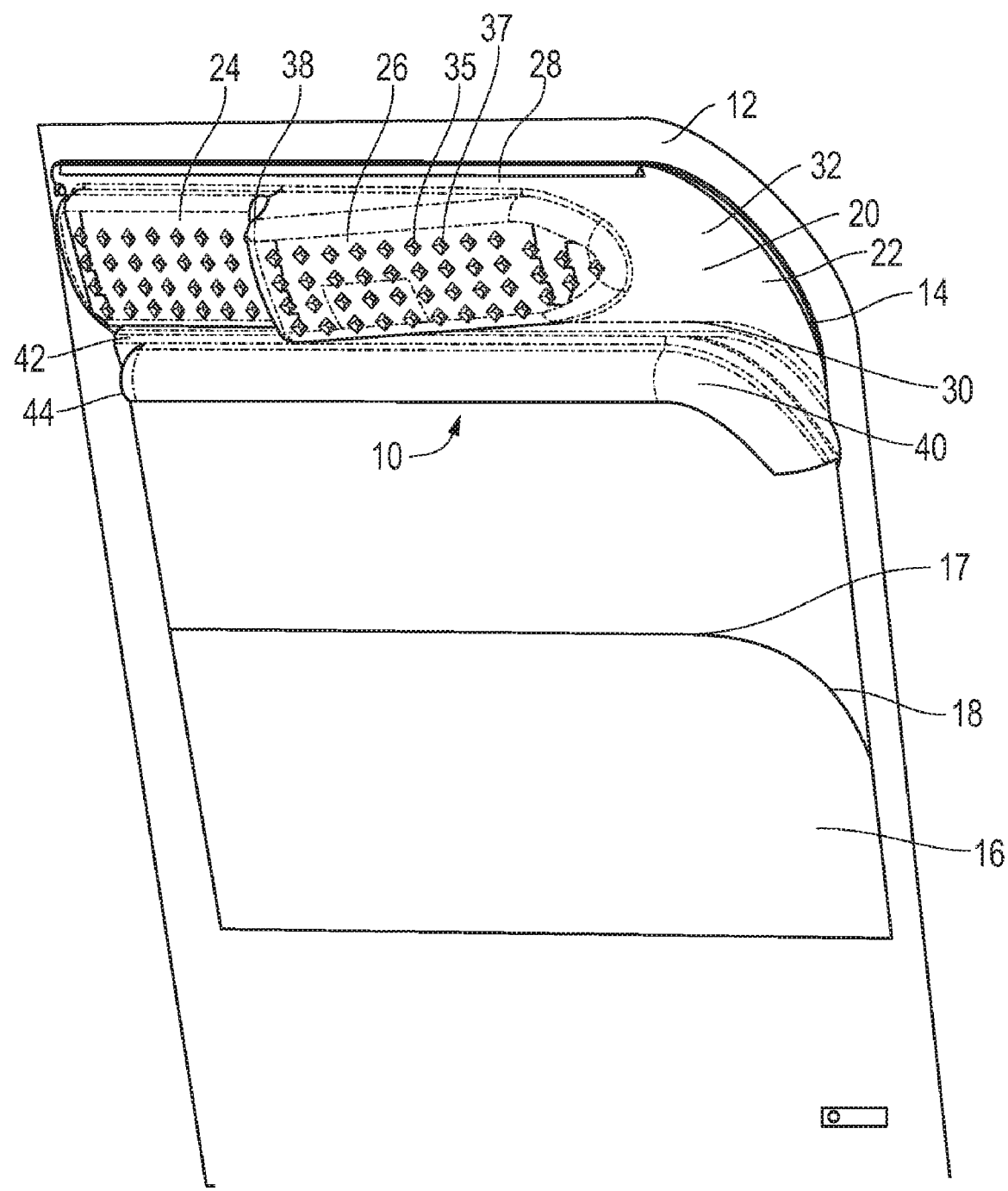
FIG. 1 depicts a front perspective view of a driver's side cabin exhaust device positioned on a vehicle's door frame in accordance with one embodiment of the present invention, as seen from the vehicle's exterior.

The following discussion is presented to enable a person skilled in the art to make and use the invention. The general principles described herein may be applied to embodiments and applications other than those detailed below without departing from the spirit and scope of the present invention as defined by the appended claims. The present invention is not intended to be limited to the embodiments shown, but is to be accorded the widest scope consistent with the principles and features disclosed herein.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative of but a few of the various ways in which the principles of the invention may be employed. Other objects, advantages, and novel features of the invention will become apparent from the following detailed description of the invention when considered in conjunction with the drawings.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and devices for carrying out the several purposes of the present invention. It is important, therefore, that the claims be regarded as including such equivalent constructions insofar as they do not depart from the spirit and scope of the present invention.

FIG. 1 illustrates a front view of a driver's side cabin exhaust device 10 positioned on a vehicle's door frame 12, near a window frame 14, in accordance with one embodiment of the present invention, as seen from the vehicle's exterior. The cabin exhaust device 10 comprises a removably mounted ventilating panel 20, having a base 22, a first portion 24, a second portion 26, a top side 28, a bottom side 30, an outer surface 32 and an inner surface 34 (FIG. 2), a rear panel 60 (FIG. 2), a squeegee 50 (FIG. 2), and a drip shield 40, having an upper area 42 and a lower area 44. The cabin exhaust device 10 is shaped to follow the contours of a window panel's 16 top edge 17 and upper rear edge 18. In this embodiment, the cabin exhaust device 10 is approximately 22¼ inches in length and approximately 4½ inches in width, which includes the dimensions of the drip shield 40. At the side of the cabin exhaust device's 10 greatest width, the width is approximately 6 inches. It will be understood by one skilled in the art, however, that these dimensions may be altered depending on the size and shape of different window frames without departing from the scope and spirit of the present invention As seen in FIG. 1, in this embodiment the cabin exhaust device 10 is adapted for mounting on the door frame 12, just above where the window frame 14 meets the door frame 12. The cabin exhaust device 10 is mounted via a double-sided adhesive tape (not shown) placed on the inner surface 34 (FIG. 2) of the ventilating panel's 20 top side 28. The cabin exhaust device 10 may alternatively be mounted in an opening 19 (FIG. 6) formed between the window panel's 16 top edge 17 and the window frame 14. In the alternative mounting, the cabin exhaust device 10 may be mounted either by placing a two-sided adhesive tape (not shown) on the outer surface 32 of the ventilating panel's 20 top side 28 and placing it in the opening 19 (FIG. 6) or by hand torquing the cabin exhaust device 10 along its longitudinal axis so that it snaps into place within the opening 19 (FIG. 6) and is retained by frictional tension translated along portions of the ventilating panel's 20 top side 28.

The ventilating panel 20, the drip shield 40, and the rear panel 60 (FIG. 2) is preferably made from a strong transparent polycarbonate or acrylic material, thus allowing the driver to have unobstructed vision during operation. It will be understood by one skilled in the art, however, that although this embodiment uses a polycarbonate material, other materials that are transparent or at least translucent and impact resistant, such as acrylic, Plexiglas and other polymers, may be used without departing from the scope and spirit of the present invention. The material's transparent and resilient capabilities allow the cabin exhaust device 10 to be tinted with ultraviolet protection so that it may provide driver/passenger relief from sun glare and heat. However, it is contemplated by the present invention that the cabin exhaust device 10 can be made of a clear and/or colored material without departing from the scope and spirit of the present invention.

Figure 2:
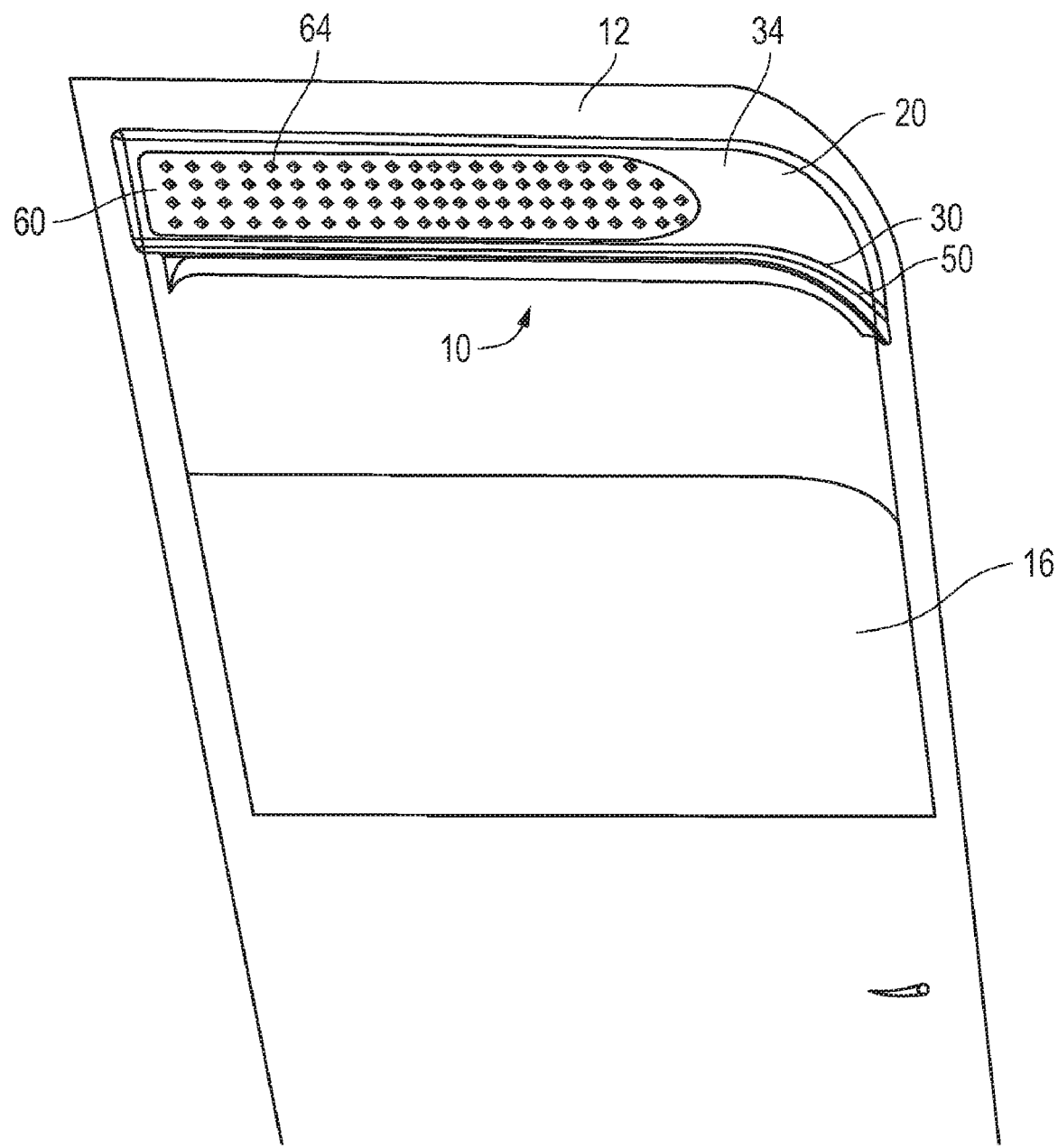
FIG. 2 depicts a rear view of a passenger's side cabin exhaust device positioned on a vehicle's door frame in accordance with one embodiment of the present invention, as seen from the vehicle's interior.

As mentioned above, the present invention further comprises a squeegee 50 (FIG. 2) that is preferably made from a weather stripping material, very much like a windshield wiper's blade, so that the window panel 16 may roll up and down while maintaining continuous sealed contact with the squeegee 50 (FIG. 2). It will be understood by one skilled in the art, however, that although this embodiment uses a weather stripping material for the squeegee 50 (FIG. 2), other materials that allow the window panel 16 to roll up and down while maintaining continuous sealed contact with the squeegee 50 (FIG. 2) may be used without departing from the scope and spirit of the present invention.

In further reference to FIG. 1, the first portion 24 of the ventilating panel 20 is positioned facing towards the front end of the vehicle and is integrally connected to the second portion 26 of the ventilating panel 20. It will be understood by one skilled in the art, however, that although this embodiment depicts the first portion 24 being integrally connected to the second portion 26, the first portion 24 may be removably connected to the second portion 26 without departing from the scope and spirit of the present invention.

As can be seen in FIG. 1, the first portion 24 and the second portion 26 are both convexly shaped with respect to the base 22, as seen from the vehicle's exterior. The first portion 24 is raised a first distance above the base 22 and the second portion 26 is raised a second distance above the first portion 24, thereby forming an air dam 38 between the second portion 26 and the first portion 24. The air dam 38 is at an obtuse angle between the first portion 24 and the second portion 26, but is not limited only thereto, such an angle. In this embodiment, the first portion 24 is raised about 0.750 inches above the base 22 and the second portion 26 is raised about 1.7 inches above the first portion 24 near the air dam 38. The second portion 26 is in a gradual decline as it runs away from the air dam 38 and towards the base 22. The first portion 24 runs horizontally about 6.5 inches with about a zero degree slope, while the second portion 26 runs generally horizontally about 12 inches and slopes downwardly away from the air dam 38 at about a 12° degree angle towards the base 22. The air dam 38 is at about a 60° degree angle in this embodiment. It will be understood by one skilled in the art, however, that the distances and slope angles stated above may be altered to achieve various desired results without departing from the scope and spirit of the present invention.

Also shown in FIG. 1, the ventilating panel's 20 first portion 24 and second portion 26 comprises a plurality of apertures 35. These apertures 35 extend through the thickness of the ventilating panel 20. Each aperture 35 is formed at an angle to a vertical axis of the ventilating panel 20, so than an aperture inlet 36 (FIG. 3), located on the ventilating panel's 20 inner surface 34 (FIG. 3), is at a different vertical level from an aperture outlet 37 thereof. The apertures 35 extend upwardly toward the top side 28 and forwardly toward the front of the vehicle, from the outer surface 32 to the inner surface 34 (FIG. 3), which can be better seen in FIG. 5. These apertures 35 are formed at an angle ranging from about 20 degrees to about 80 degrees, but preferably at about 40 degrees.

It will be understood by one skilled in the art, however, that these aperture angles may vary, so long as a pressure differential is created between the vehicle's interior and its exterior which thereby creates a vacuum within the vehicle's interior, without departing from the scope and spirit of the present invention. The apertures 35 can be formed in a staggered relationship with respect to each other, in alignment, or positioned in any random order, as desired. Each aperture 35 is approximately ³⁄₃₂" in diameter and spaced between ⅛" to ¼" intervals. Although this embodiment depicts and discloses various diameters, intervals and aperture shapes, the diameters, intervals and shape of the apertures may vary in size and shape (e.g., any geometric shape) without departing from the scope and spirit of the present invention.

As seen in FIG. 1, the drip shield's 40 upper area 42 extends longitudinally along the entire ventilating panel's 20 bottom side 30 and is integrally connected to the ventilating panel's 20 bottom side 30. It will be understood by one skilled in the art, however, that although this embodiment depicts the drip shield 40 being integrally connected to the ventilating panel 20, the drip shield 40 may also be removably connected to the ventilating panel 20 without departing from the scope and spirit of the present invention. When viewed from the vehicle's exterior, the drip shield 40 extends convexly from the drip shield's 40 upper area 42 to its lower area 44. In this embodiment, the drip shield 40 is about 1.5 inches in width. It will be understood by one skilled in the art, however, that the width, distance and shape (i.e., convex) may be varied without departing from the scope and spirit of the present invention. Specifically, the drip shield can be any suitable shape while still accomplishing the intended purpose thereof.

FIG. 2 depicts a rear view of the cabin exhaust device 10 positioned on a vehicle's window door frame 12 in accordance with one embodiment of the present invention, as seen from the vehicle's interior. The rear panel 60 is located on the ventilating panel's 20 inner surface 34 directly opposite the ventilating panel's 20 first portion 24 (FIG. 1) and second portion 26 (FIG. 1). The rear panel 60 creates an air chamber 62 (FIG. 6) between the rear panel 60 and the ventilating panel's 20 first portion 24 (FIG. 1) and second portion 26 (FIG. 1). The rear panel 60 consists of a plurality of channels 64, positioned at the same angles as the apertures 35 (FIG. 1) in the ventilating panel's 20 first portion 24 (FIG. 1) and second portion 26 (FIG. 1). Although this embodiment depicts the channels 64 as being the same as the apertures 35 (FIG. 1), these channels 64 can be different in shape, diameter and angle without departing from the scope and spirit of the present invention.

FIG. 2 also shows the squeegee 50 wherein the squeegee 50 is removably connected along the entire bottom side 30 of the ventilating panel's 20 inner surface 34. It will be understood by one skilled in the art, however, that although this embodiment depicts the squeegee 50 being removably connected to the ventilating panel 20, the squeegee 50 may also be integrally connected to the ventilating panel 20 without departing from the scope and spirit of the present invention. As viewed from the vehicle's interior, the squeegee 50 extends longitudinally at a distance such that when the cabin exhaust device 10 is properly mounted, the squeegee 50 forms a continuous sealed contact with a window panel 16 along its entire length when the window panel 16 is fully seated in a rolled-up configuration. This continuous sealed contact allows a pressure differential to be created along the ventilating panel 16. In this embodiment, the squeegee 50 extends outwardly about 0.750 inches. It will be understood by one skilled in the art, however, that this distance may be varied without departing from the scope and spirit of the present invention.

Figure 3:
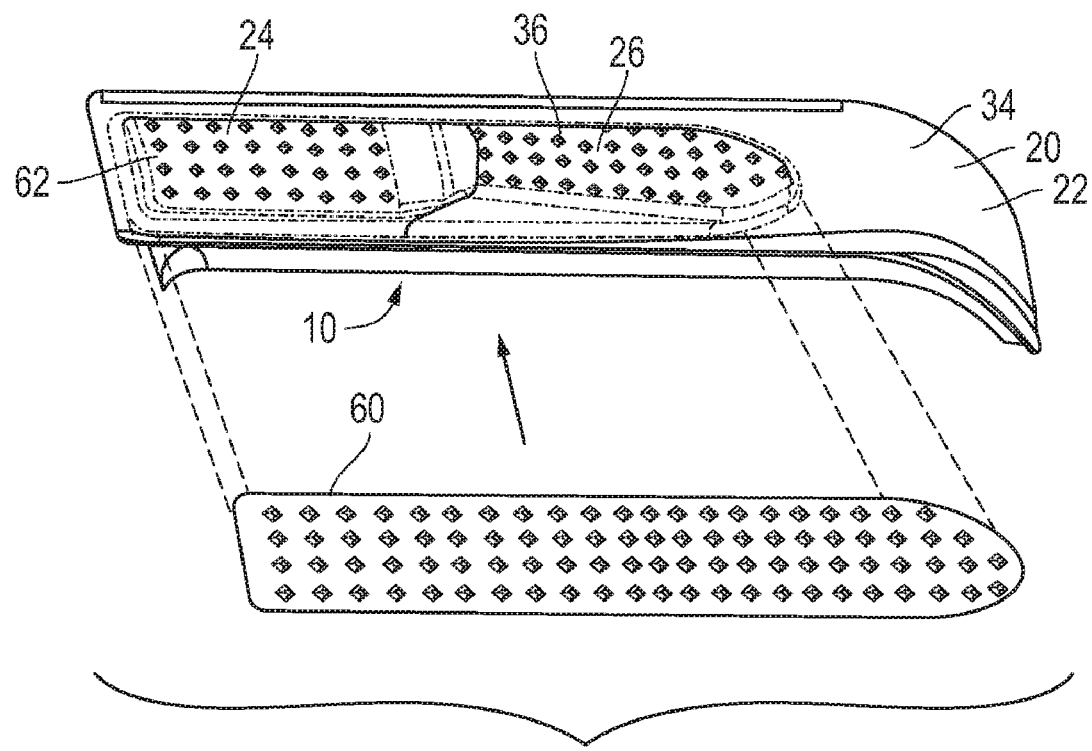
FIG. 3 depicts a rear view of the passenger's side cabin exhaust device with the rear panel removed in accordance with one embodiment of the present invention.

FIG. 3 depicts a rear view of the passenger's side cabin exhaust device 10 with the rear panel 60 removed in accordance with one embodiment of the present invention. The inner surface 34 of the ventilating panel's 20 first portion 24 and second portion 26 is shown, which further illustrates the aperture inlets 36 of the cabin exhaust device 10. It can be seen that the inner surface 34 of the ventilating panel's 20 first portion 24 and second portion 26 is not uniformly level when compared to each portion 24, 26, nor is it uniformly level when compared with the base 22. Thus, once the rear panel 60 is placed behind the ventilating panel's 20 first portion 24 and second portion 26, the air chamber 62 (FIG. 6) is created between the rear panel 60 and the ventilating panel's 20 first portion 24 and second portion 26.

Figure 4:
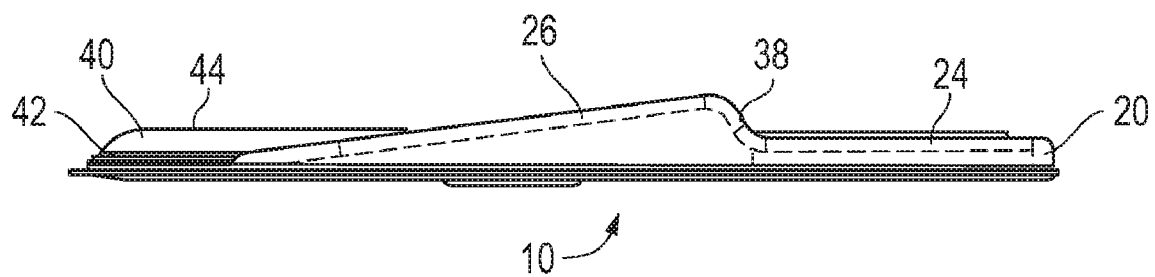
FIG. 4 depicts a top view of the driver's side cabin exhaust device in accordance with one embodiment of the present invention.

FIG. 4 depicts a top view of the driver's side cabin exhaust device 10 in accordance with one embodiment of the present invention. The relative elevations of the ventilating panel's 20 first portion 24 and second portion 26 and the relative elevation and angle of the air dam 38, as are described in reference to FIG. 1 and FIG. 3, can be seen. The drip shield's 40 convexity from its upper area 42 towards its lower area 44 can also be visualized.

Figure 5:
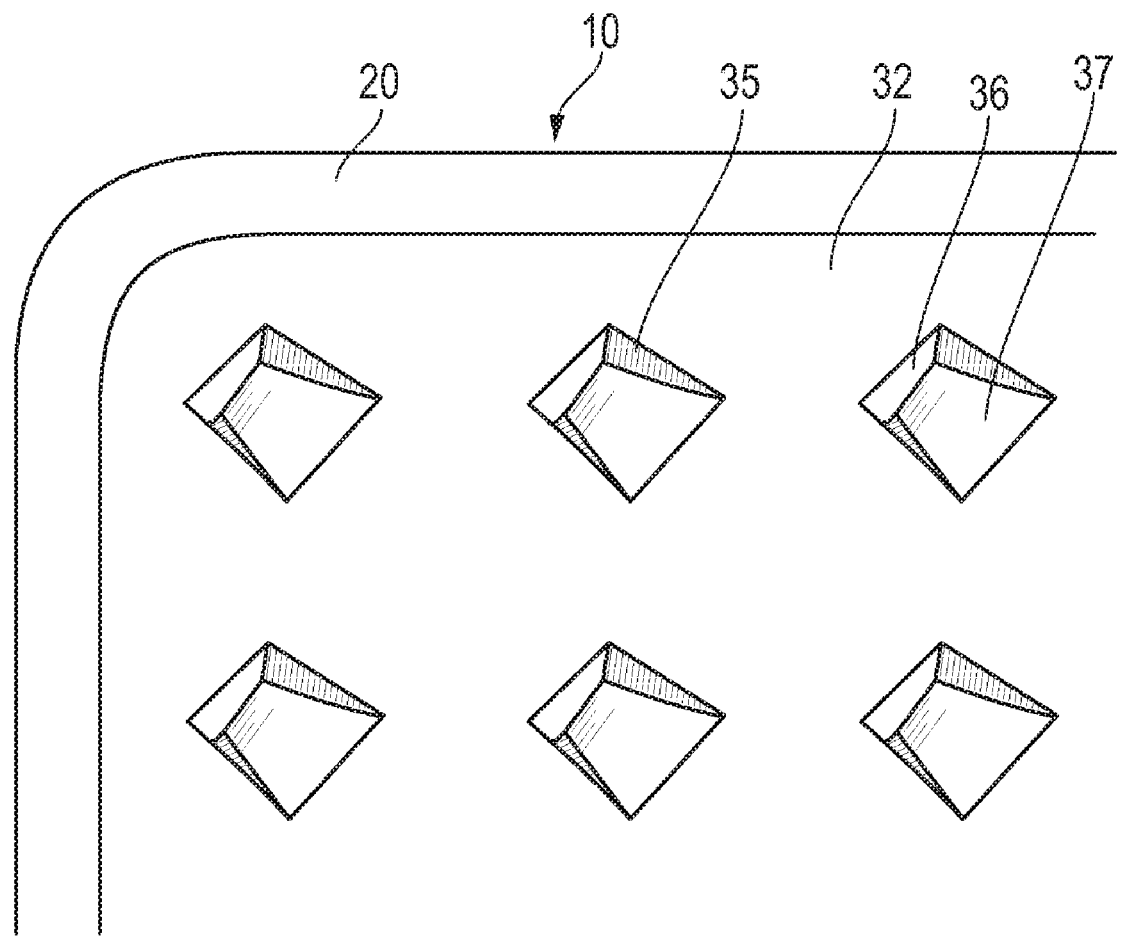
FIG. 5 depicts a close-up view of the cabin exhaust device's apertures in accordance with one embodiment of the present invention.

FIG. 5 depicts a close-up view of the cabin exhaust device's 10 apertures 35 in accordance with one embodiment of the present invention. As can be seen more clearly in this FIG. 5, the apertures 35 extend upwardly and forwardly from the outer surface 32 towards the inner surface 34 (FIG. 3). The aperture outlets 37 are located on the ventilating panel's 20 outer surface 32, while the aperture inlets 36 are located on the ventilating panel's 20 inner surface 34 (FIG. 3). As mentioned previously, these apertures 35 are formed at an angle ranging from about 20 degrees to about 80 degrees, but preferably at about 40 degrees. These apertures 35 are positioned and angled to create a sufficient pressure differential between the vehicle's interior and its exterior while the vehicle is in motion at any speed, thereby producing a vacuum effect within the vehicle's interior. Thus, air and other contaminants are forcefully exhausted from the vehicle's interior through the aperture inlets 36 and the aperture outlets 37.

Figure 6:
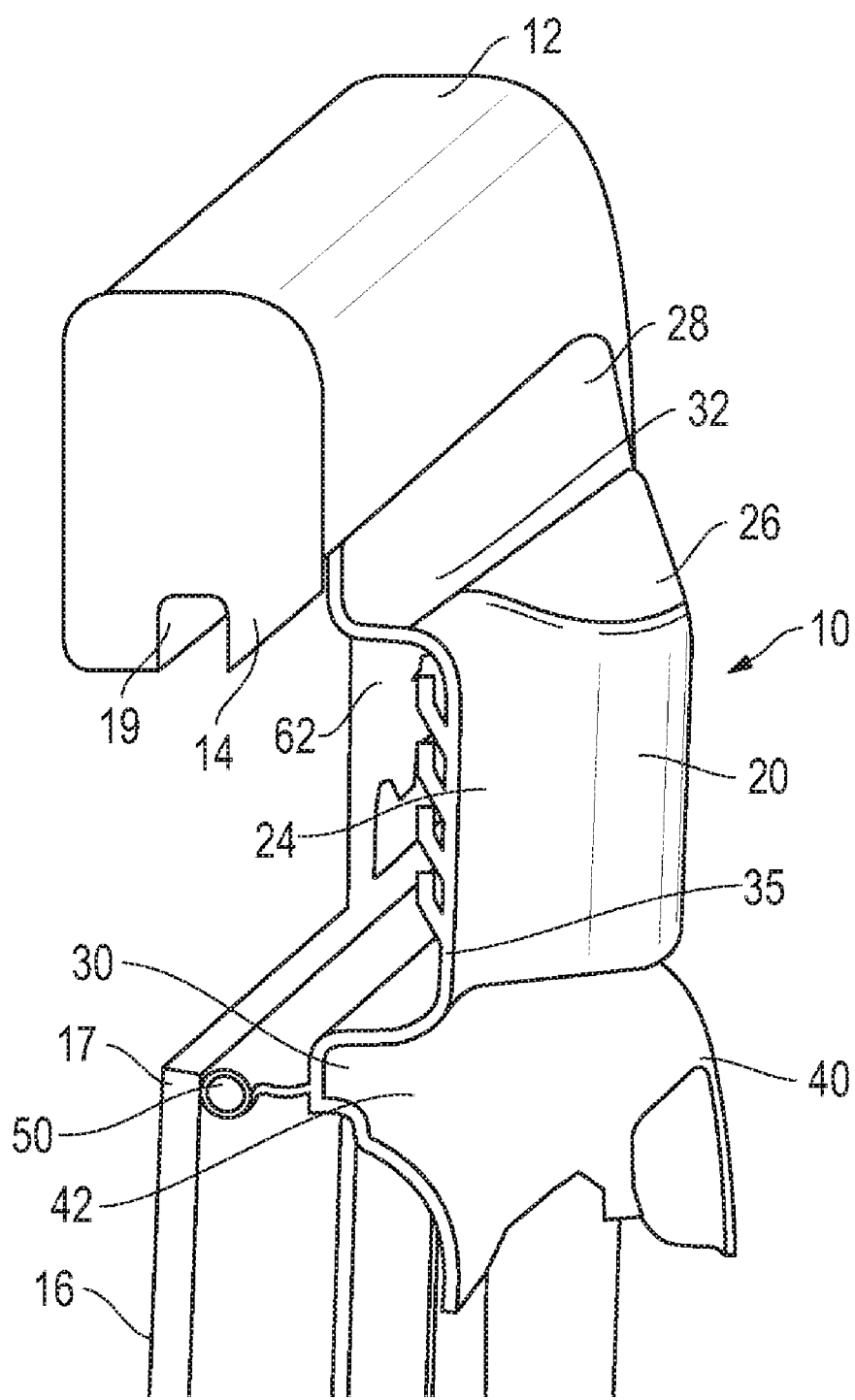
FIG. 6 depicts a cross-sectional view of the cabin exhaust device in accordance with one embodiment of the present invention.

FIG. 6 depicts a cross-sectional view of the cabin exhaust device 10 in accordance with one embodiment of the present invention. In this embodiment, the ventilating panel's 20 top side 28 is mounted on the door frame 12 in the area just above where the window frame 14 meets the door frame 12 via a double-sided adhesive tape (not shown). Also, the rear panel 60 (FIG. 2) has been removed and is not shown in FIG. 6 so that the operations of the present invention can be explained with simplicity. This embodiment also shows the squeegee 50 attached longitudinally along the ventilating panel's 20 entire length at a location immediately above where the ventilating panel's 20 bottom side 30 meets with the drip shield's 40 upper area 42. The squeegee 50 is shown to have a circular cross-section in the present embodiment. Although this embodiment depicts a circular cross-section squeegee 50, the squeegee 50 may have virtually any type of cross-section such as, but not limited to, a straight cross-section, a v-shaped cross-section, a square-shaped cross-section or any other geometrically shaped cross-section without departing from the scope and spirit of the present invention. The squeegee 50 must, however, be able to provide a continuous sealed fitting with the window panel 16 along its entire length.

The cabin exhaust device's 10 method of use can be understood by explanation while viewing FIG. 6. The cabin exhaust device 10 does not function when the window panel 16 is rolled-up and seated within the opening 19, whether the vehicle is in motion or is stationary. As can be seen, by using the squeegee 50 to create the barrier to form a pressure differential between the vehicle's interior and its exterior, the window panel 16 is capable of being seated within the opening 19. However, once the window panel 16 is rolled down even a small distance, such that the window panel 16 is no longer in the opening 19, a vacuum effect is created in the vehicle's interior, thereby exhausting by a pushing effect the air through the cabin exhaust device 10 and out to the vehicle's exterior. The squeegee 50 forms a continuous seal longitudinally along its entire length, thus forming a contact barrier between the vehicle's interior air and the outside atmosphere. When the vehicle is stationary, the vacuum effect is created by way of the vehicle's interior temperature being increased. Specifically, as the vehicle's interior temperature increases, the vehicle's interior pressure simultaneously increases, thereby causing the warmer air inside the vehicle to rise and forcefully exit the cabin exhaust device 10 to the outside atmosphere, which is at a cooler temperature and a lower pressure. Thus, the vehicle's inside temperature is caused to be cooled.

When the vehicle is in motion, the pressure is reduced along the ventilating panel's 20 outer surface 32 due to the airflow along the angle and positioning of the first portion's 24 and second portion's 26 apertures 35. A vacuum effect is thereby created to forcefully push the air from within the vehicle's interior to its exterior. The maximum vacuum effect occurs when all the apertures 35 are exposed to the vehicle's interior. This effect occurs when the window panel 16 is lowered to a point where the window panel's 16 top edge 17 barely remains in a continuous sealed contact with the squeegee 50.

Once the window panel 16 is rolled down to a point where the window panel 16 is no longer in a continuous sealed contact with the squeegee 50, the vacuum effect is significantly reduced. At this point, the squeegee 50 no longer forms a barrier between the vehicle's interior air and the outside atmosphere, thus resulting in zero pressure differential.

Figure 7:
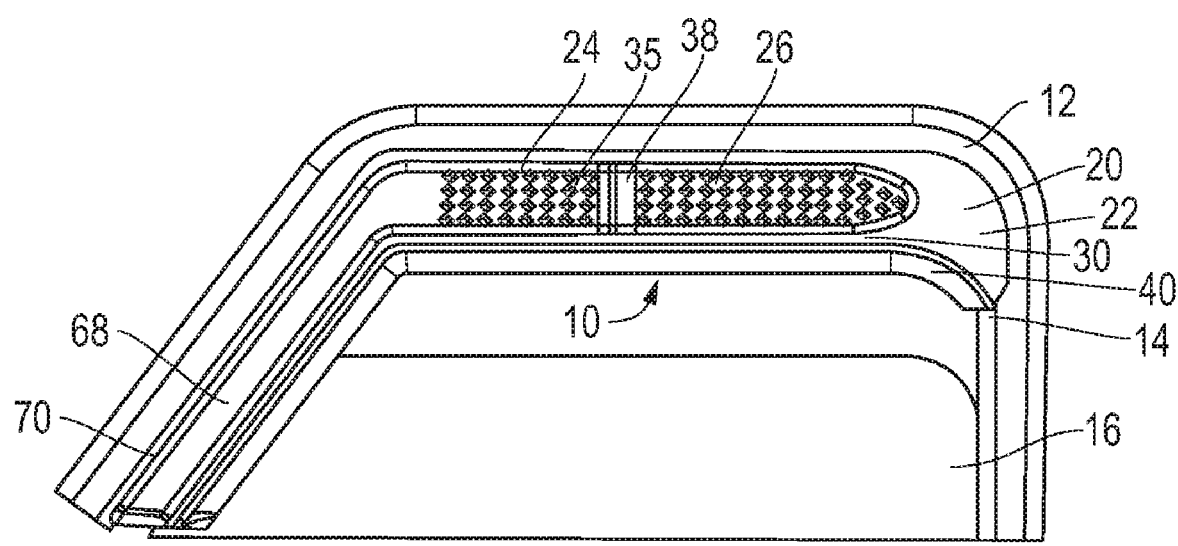
FIG. 7 depicts a front view of a driver's side cabin exhaust device positioned on an automobile's door frame in accordance with another embodiment of the present invention, as seen from the automobile's exterior.

FIG. 7 depicts a front view of a driver's side cabin exhaust device 10 positioned on an automobile's door frame 12 in accordance with another embodiment of the present invention, as seen from the automobile's exterior. This embodiment is identical to the previous embodiment's design except that there is an additional third portion 68 attached to the ventilating panel 20. This embodiment includes the drip shield 40, the first portion 24, the second portion 26, the air dam 38, the rear panel 60 (FIG. 3), and apertures 35 positioned and angled in the same manner as described in relation to the previous FIGS. 1-6. The third portion 68 is integrally connected to the ventilating panel 20 at a planar obtuse angle so that it extends along the window frame's 14 front portion 70. The third portion 68 is utilized in this embodiment because often, but not always, an automobile's window panel 16 is shaped differently than the panels found in commercial trucks. It will be understood by one skilled in the art, however, that this third portion 68 may be detachably connected utilizing common fasteners or frictional snaps to the ventilating panel 20 without departing from the scope and spirit of the present invention.

There are several benefits which arise from the present invention. First, an air dam 38 is strategically placed along the ventilating panel 20. As the vehicle moves in a forward motion, turbulence is first created by the relative wind created by the motion which then contacts the edge of the vehicle's windshield (not shown) and the front edge of the first portion 24, which causes a pressure decrease or differential along the ventilating panel's 20 first portion 24. Thus, a vacuum effect is created in the vehicle's interior along at least the first portion 24. Turbulence is next created at the strategically located air dam 38, which causes an additional pressure decrease or differential along the ventilating panel's 20 second portion 26. Thus, a vacuum effect is created in the vehicle's interior along at least the second portion 26. Hence, there is now a complete vacuum effect created along the entire first portion 24 and second portion 26.

Second, a drip shield 40 is attached longitudinally along the entire ventilating panel's 20 bottom side 30 and allows for a partial window panel 16 opening that exposes the interior to be shielded from rain and direct wind. The drip shield 40 also proves to be beneficial to the increasing use of internet cable hookup located at numerous truck lots.

Third, the apertures 35 are designed to also serve as a rain-retarding barrier via their positionally disposed angles and precise mold shutoffs.

Fourth, the rear panel 60 serves as an additional rain-retarding barrier to prevent rain and other environmental nuisances from entering the vehicle's cabin. Although the apertures 35 are designed to prevent rain from entering the vehicle's cabin, the rear panel 60 further serves as a secondary protective layer.

Finally, since a vacuum effect is created within the vehicle's interior, the airflow controlled via the vehicle's control panel (not shown) increases even when the setting remain the same. This results in a more efficient airflow with lesser fuel consumption.

As seen in FIG. 6, when not in use, the cabin exhaust device 10 is easily removed by either pulling it to disengage the double-sided adhesive (not shown) from the door frame 12, as depicted in FIG. 6, or from the opening 19, or by pulling down to disengage the cabin exhaust device 10 from the opening 19, depending on which method was used for mounting. When removed, the cabin exhaust device 10 can be easily stored in a trunk of a car and retrieved for positioning on the door frame 12 or in the window frame 14.

The cabin exhaust device 10 can be manufactured in pairs, one for a driver's side and one for the passenger's side of a vehicle, it being understood that the passenger's side cabin exhaust device 10 is a mirror image of the driver's side cabin exhaust device 10. As previously described, since the cabin exhaust device 10 is formed from a transparent material, the driver's vision is not impaired.

The present invention underwent numerous and rigorous testing procedures as will now be described:

Stationary Exhaust Testing: Acknowledging that hot air rises and a plurality of holes provide a natural means of exhaust within a stationary vehicle, the inventor vertically angled the apertures, having the aperture inlets on the ventilating panel's inner surface and positioned vertically higher than the aperture outlets located on the ventilating panel's outer surface, thus creating a rain-retarding barrier.

Rain-Retardant Testing: The present invention was installed in a truck window and subjected to a variety of rainy conditions. The results revealed a dry inner surface with no rain entering the vehicle's interior. These results were very successful, which lead to even further testing. The further testing was conducted by simulating rain, via a common showerhead, under several different flow selections and angles. These further tests were as successful as the initial tests. Thus, it was decided that a cabin exhaust device having apertures positioned at a vertical angle, wherein the aperture inlets are located on the inner surface and positioned vertically higher than the aperture outlets located on the outer surface, creates a rain-retarding barrier. When the aperture angle is manipulated, the possibility of creating vacuum in the vehicle's interior exists when the vehicle is in forward motion.

Vacuum Testing: While a vehicle is in forward motion, a pressure differential sustaining vacuum within the vehicle's interior is created along the cabin exhaust device when the apertures are positioned at an upward and forward angle from the outer surface to the inner surface. Testing showed that angling the apertures closer to the horizontal increased the vacuum strength, but decreased the rain-retardant capabilities. The addition of a smooth bell-shaped trough to the aperture's outlet terminal point proves to assist with water displacement. The ideal angle was achieved by testing different aperture angles in a rain environment. Ideal diametric sizing was achieved by testing different sizes at the ideal angle position and comparing the noise versus vacuum results. Once ideal angle and ideal diametric sizing was achieved, further testing was performed for vacuum and noise in the diesel truck cabin, while the truck moved forward at various speeds. The testing results showed that outwardly convexing the ventilating panel would increase vacuum potential. During testing, the number of apertures were increased and decreased until the desired vacuum was achieved. Further testing revealed the ability to engage and disengage the cabin exhaust device's vacuum ability by using the cabin's console "recirculation" and "fresh air" options. The console's "fresh air" mode increases circulation, while the "recirculation mode" decreases vacuum to a minimum.

Conclusion: Final testing revealed a cabin exhaust device that provided a continuous interior exhaust at a level sufficient enough to eliminate unwanted odors and excessive heat, with minimal temperature change from selected climates. The cabin exhaust device reduced interior fogging as well as sheltered the vehicle's interior from rain, dust and pollen accumulation, unauthorized intrusions, direct heat and ultraviolet rays.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. It is therefore, contemplated that the claims will cover any such modifications or embodiments that fall within the true scope of the invention.

What is claimed is:

1. A cabin exhaust device for ventilating a vehicle, the cabin exhaust device comprising;
    a vehicle cabin ventilating panel including an inner surface, an outer surface, a top side removably mountable to a window frame of the vehicle, a first portion having an outwardly convex shape, a second portion having an outwardly convex shape, and a bottom side, wherein the outwardly convex shape of the first portion and the second portion is defined between the top side and the bottom side;

a plurality of apertures disposed in the first portion and the second portion facing outwardly away from the outer surface, the plurality of apertures extending from the outer surface to the inner surface; and an angled air dam disposed between the first portion and the second portion extending across the vehicle cabin ventilating panel from the bottom side to the top side, wherein an end of the first portion is spaced apart from an end of the second portion at the angled air dam by a predetermined distance wherein the predetermined distance is a function of the height of the angled air dam as measured outwardly from the outer surface of the first portion.

2. The cabin exhaust device of claim 1, wherein the plurality of apertures disposed in the first portion are pointing at an angle towards the angled air dam and wherein the plurality of apertures disposed in the second portion are pointing at an angle away from the angled air dam.

3. The cabin exhaust device of claim 1, wherein the plurality of apertures comprises a plurality of inlets disposed on the inner surface of the vehicle cabin ventilating panel and a plurality of outlets disposed on the outer surface of the vehicle cabin ventilating panel.

4. The cabin exhaust device of claim 1, wherein the plurality of apertures are formed at an angle of 20 degrees to 80 degrees.

5. The cabin exhaust device of claim 1, wherein the first portion and the second portion extend longitudinally along the top side and the bottom side of the vehicle cabin ventilating panel.

6. The cabin exhaust device of claim 1, wherein the angled air dam extends perpendicularly to the top side and the bottom side of the vehicle cabin ventilating panel.

7. The cabin exhaust device of claim 1, further comprising: a rear panel attached to the inner surface directly behind the first portion and the second portion.

8. The cabin exhaust device of claim 1, further comprising: a drip shield attached to the bottom side of the vehicle cabin ventilating panel extending along an entire length of the vehicle cabin ventilating panel.

9. The cabin exhaust device of claim 8, further comprising: a squeegee attached to the inner surface and disposed between the bottom side and the drip shield.

10. A method for ventilating a moving vehicle comprising:
providing a vehicle cabin ventilating panel having a top side, a bottom side, an inner surface, and an outer surface;
providing a first portion having an outwardly convex shape and a second portion having an outwardly convex shape in the vehicle cabin ventilating panel extending longitudinally along the top side and the bottom side, wherein the outwardly convex shape of the first portion and the second portion is defined between the top side and the bottom side;
providing a plurality of apertures in the first portion and the second portion facing outwardly away from vehicle cabin ventilating panel and extending from the outer surface to the inner surface;
providing an angled air dam between the first portion and the second portion extending across the vehicle cabin ventilating panel from the bottom side to the top side, wherein an end of the first portion is spaced apart from an end of the second portion at the angled air dam by a predetermined distance wherein the predetermined distance is a function of the height of the angled air dam as measured outwardly from the outer surface of the first portion; and mounting the top side of the vehicle cabin ventilating panel to a window frame of the vehicle to direct air flow from an interior of the vehicle to an exterior of the vehicle through the plurality of apertures when the vehicle is in motion.

11. The method of claim 10, wherein providing a vehicle cabin ventilating panel having a top side and a bottom side comprises:
providing a top side extending longitudinally along the window frame of the vehicle;
providing a bottom side extending parallel to the top side.

12. The method of claim 10, wherein providing a plurality of apertures in the first portion and the second portion facing outwardly away from the vehicle cabin ventilating panel comprises:
providing a plurality of apertures pointing at an angle towards the angled air dam in the first portion; and
providing a plurality of apertures pointing at an angle away from the angled air dam in the second portion.

13. The method of claim 10, wherein providing an angled air dam between first portion and the second portion extending across the vehicle cabin ventilating panel from the bottom side to the top side comprises:
providing an angled air dam extending perpendicularly to the top side and the bottom side of the vehicle cabin ventilating panel.

14. The method of claim 10, wherein mounting the top side of the vehicle cabin ventilating panel to a window frame of the vehicle to direct air flow from an interior of the vehicle to an exterior of the vehicle through the plurality of apertures when the vehicle is in motion comprises:
providing a plurality of inlets in the plurality of apertures on an inner surface of the vehicle cabin ventilating panel;
providing a plurality of outlets in the plurality of apertures on an outer surface of the vehicle cabin ventilating panel; and
directing air flow through the plurality of apertures from the plurality of inlets to the plurality of outlets.

15. The method of claim 10, further comprising:
providing a drip shield attached to the bottom side;
providing a squeegee attached to an inner surface of the vehicle cabin ventilating panel and between the bottom side and the drip shield; and
facilitating the creation of a pressure differential between the interior of the vehicle and the exterior of the vehicle when the squeegee meets a top of a window panel of the vehicle.

16. A cabin ventilating device comprising:
a vehicle cabin ventilating panel comprising a top side, a bottom side, and a first portion having an outwardly convex shape and a second portion having an outwardly convex shape extending longitudinally along the top side and the bottom side, wherein the outwardly convex shape of the first portion and the second portion is defined between the top side and the bottom side;
a plurality of apertures disposed in the first portion and the second portion facing outwardly away from the vehicle cabin ventilating panel, the plurality of apertures being defined by a protruding portion extending inwardly from an inner surface of the vehicle cabin ventilating panel; and
an angled air dam disposed between the first portion and the second portion extending across the vehicle cabin ventilating panel perpendicularly to the top side and the bottom side, wherein an end of the first portion is spaced apart from an end of the second portion at the angled air dam by a predetermined distance wherein the predetermined distance is a function of the height of the angled air dam as measured outwardly from an outer surface of the first portion.

17. The cabin ventilating device of claim 16, wherein the plurality of apertures comprises:

a first plurality of apertures disposed in the first portion pointing at an angle towards the angled air dam; and a second plurality of apertures disposed in the second portion pointing at an angle away from the angled air dam.

18. The cabin ventilating device of claim 16, further comprising:

a rear panel attached to the inner surface of the vehicle cabin ventilating panel directly behind the first portion and the second portion.

19. The cabin ventilating device of claim 16, further comprising:

a drip shield attached to the bottom side of the vehicle cabin ventilating panel extending along an entire length of the vehicle cabin ventilating panel.

20. The cabin ventilating device of claim 19, further comprising:

a squeegee attached to the inner surface and disposed between the bottom side and the drip shield.

* * * * *